United States Patent [19]  [11] 4,350,107
Mattox  [45] Sep. 21, 1982

[54] AIR CUSHION VEHICLE

[76] Inventor: Darryl F. Mattox, 12 Rock Bath Rd., Palm Beach, N.S.W., 2108, Australia

[21] Appl. No.: 68,088

[22] Filed: Aug. 20, 1979

[30] Foreign Application Priority Data

Aug. 23, 1978 [AU] Australia .................. PD5620
Aug. 23, 1978 [AU] Australia .................. PD5621

[51] Int. Cl.³ ................................. B63B 1/38
[52] U.S. Cl. ................... 114/67 A; 180/117; 180/121
[58] Field of Search ............... 114/67 A; 180/116-128

[56] References Cited

U.S. PATENT DOCUMENTS

| | | | |
|---|---|---|---|
| 3,209,847 | 10/1965 | Beardsley | 180/123 |
| 3,371,737 | 3/1968 | Hall | 180/117 |
| 3,397,753 | 8/1968 | Hunt et al. | 180/127 |
| 3,478,836 | 11/1969 | Eckered et al. | 114/67 A |
| 3,532,180 | 10/1970 | Ford et al. | 180/123 |
| 3,677,361 | 7/1972 | Bertin | 180/127 |
| 3,850,126 | 11/1974 | Leonard | 114/67 A |
| 4,090,459 | 5/1978 | Chaplin | 115/67 A |
| 4,103,755 | 8/1978 | Tattersal | 180/120 |
| 4,166,515 | 9/1979 | Tattersal | 180/126 |

OTHER PUBLICATIONS

SN. 895,592, (4/12/78), Mattox.

Primary Examiner—George E. A. Halvosa
Assistant Examiner—Jesus D. Sotelo
Attorney, Agent, or Firm—Stevens, Davis, Miller & Mosher

[57] ABSTRACT

A water borne air cushion vehicle having a flat rigid upper rectangular sheet-like platform, and a plurality of flat rigid longitudinal walls attached substantially at right angles thereto and depending therefrom substantially parallel with the major axis of the platform. Two of the walls are disposed as side walls along respective edges of the platform, and a plurality of longitudinally spaced laterally aligned arrays of flexible trough-shaped skirts are looped with a space therein and fastened along the longitudinal edge of the underside of the platform flush with, but movable with respect to adjacent pairs of the walls. The skirts are extendable to a lesser depth than that of the walls, and a source of pressurized air is admitted through apertures of fixed size at a relatively high pressure to the skirts. Also, low pressure air is admitted through variable sized openings remotely controlled and located beneath the platform in communication with at least four square or rectangular open bottomed air cushion chambers disposed laterally in pairs. Each of the four square air cushion chambers are bounded by an adjacent pair of skirts and by an adjacent pair of walls, the depth of the walls and of the skirts being so related to the flow rate of air that the vehicle is buoyant upon water. The walls protrude into the water sufficiently to prevent air spillage when the vehicle is urged longitudinally through the water by a propulsion system. The skirt air inlet openings are adapted to readmit by reverse flow at least part of the compressed air in any one of the skirts independently in response to fugitive deflection of the skirts. The skirts are bag-like structures attached along one side to the underside of the platform via a brace comprising a flexible sheet extending through the width of the skirt.

10 Claims, 20 Drawing Figures

WATER LEVEL

FIG. 6.

WATER LEVEL

FIG. 7.

WATER LEVEL

AIR CUSHION VEHICLE

This invention relates to the suspension of air cushion vehicles, and more particularly to a modification or improvement of the parent invention entitled "Waterborne Sidewall Air Cushion Vehicle" which is the subject of my co-pending Application Ser. No. 895,592 filed Apr. 12, 1978.

In the parent invention an air cushion vehicle of the "sidewall" type has a flat rigid upper rectangular sheet-like platform with a plurality of flat rigid longitudinal walls attached substantially at right angles thereto and depending therefrom substantially parallel with the major axis of said platform. The outermost two of said walls are disposed as sidewalls along the respective edges of said platform, and a plurality of longitudinally spaced laterally aligned arrays of flexible trough-like skirts is looped respectively with a space therein and fastened via each longitudinal edge thereof with respect to the underside of said platform flush with but independently moveable with respect to adjacent pairs of said walls, but extendable down to a lesser depth than that of said walls. A source of pressurised air is admissable via apertures of fixed size at a relatively higher pressure to said skirts and also admissible at a relatively lower pressure via variable-sized openings remotely controlled and located respectively beneath said platform in communication with open-bottomed air cushion chambers. Each said chamber is bounded by an adjacent pair of said skirts and by an adjacent pair of said walls, and the depth of said walls and of said skirts is so related to the flow rate of said air that the vehicle is buoyant upon water with said walls protruding into the water sufficiently to prevent air spillage via said walls when the vehicle is urged longitudinally through the water by any propulsion means. The skirt air inlet openings are adapted to re-admit by reverse flow at least part of the compressed air in any one of the skirts independently in response to fugitive deflection of the skirts resulting from any turbulence of said water to thereby inhibit movement of the vehicle about the pitch axis thereof.

A major object of the last-mentioned arrangement was to provide a smoother ride for such a vehicle over rough water, and it is an object of the present invention to improve further the ride characteristics and also the stability or "handling" of such a vehicle.

Further objects of the present invention are:

(1) To reduce the skirts' frictional contact with water and so reduce drag.

(2) To supply an air retained "bag" type skirt which, while still having maximum flexibility, will retain its cross-sectional shape and dimensions to a greater extent under load, so as to reduce the extent to which the skirt collapses in depth under load, and enhance the stability characteristics of the vehicle.

(3) To supply an air retained bag-type skirt wherein the internal air pressure in the skirt may more closely approximate the pressure in the adjacent air cushion chamber it supports, without the skirt losing its cross-sectional shape and dimensions to any great extent.

(4) To supply a longer-lasting air retained bag-type skirt.

(5) To supply an air retained bag-type skirt which may be operated at full speed in either direction of travel of the vehicle.

(6) To supply an air retained bag-type skirt which inhibits to the greatest possible extent the air loss from the air cushion it retains.

(7) To supply an air retained bag-type skirt with an inherent ability to elevate itself, and hence the vehicle, further above the bottom of wave troughs than normally possible, in order to cause the bottom of the skirts to assume an elevation closer to that of wave or chop crests, so eliminating or reducing the necessary depth of skirts and air cushions normally required to accommodate chop and wave height, and ensuring that fewer wave forces affect the vehicle.

(8) To supply an air retained bag-type skirt wherein the major wear areas are replaceable.

(9) To supply an air retained bag-type skirt which may be of a greater depth whilst retaining the above-mentioned qualities.

(10) To ensure adequate safety in the event of rupture of an air retained bag-type skirt.

(11) To supply means for enhancing the vehicle's ability to maintain a trajectory of constant altitude.

(12) To ensure adequate safety in the event of blower failure.

(13) To stop or inhibit spray issuing from under the end lateral seals of the vehicle.

(14) To supply a replaceable minimal-friction seal (that will compensate for some wall flexing) between skirt ends and sidewalls in order to inhibit air loss.

(15) To supply means for restricting the vibration normally experienced in a sidewall air cushion vehicle having air retained bag-type skirts when at rest sitting on its air cushion.

(16) To supply means for assisting an air cushion vehicle to "lift onto the plane" quickly.

(17) To supply shock-absorbing means for use when running over choppy water.

According to the present invention therefore, in one of its aspects, a waterborne air cushion vehicle comprises, in combination, a flat rigid upper rectangular sheet-like platform, a plurality of flat rigid longitudinal walls attached substantially at right angles thereto and depending therefrom substantially parallel with the major axis of said platform, the outermost two of said walls being disposed as sidewalls along the respective edges of said platform, a plurality of longitudinally spaced laterally aligned arrays of flexible trough-shaped skirts respectively looped with a space therein and fastened via each longitudinal edge thereof with respect to the underside of said platform flush with but independently movable with respect to adjacent pairs of said walls but extendable to a lesser depth than that of said walls, a source of pressurised air admissible via apertures of fixed size at a relatively higher pressure to said skirts and also admissible at a relatively lower pressure via variable-sized openings remotely controlled and located respectively beneath said platform in communication with at least four square or rectangular open-bottomed air cushion chambers disposed laterally in pairs and each bounded by an adjacent pair of said skirts and by an adjacent pair of said walls, and wherein the depth of said walls and of said skirts is so related to the flow rate of said air that the vehicle is buoyant upon water with said walls protruding into said water sufficiently to prevent air spillage via said walls when the vehicle is urged longitudinally through said water by propulsion means, and wherein said skirt air inlet openings are adapted to re-admit by reverse flow at least part of the compressed air in any one of said skirts independently in response to fugitive deflection of said skirts resulting from turbulence of said water, to thereby inhibit movement of said vehicle about the pitch axis thereof; characterised in that each said skirt is a bag-type skirt adapted to retain its cross-sectional shape under load by virtue of captive air therein.

According to the present invention in another of its aspects a vehicle, as broadly defined above, includes also in combination one or more foils attached with respect to at least some of said walls and each oriented with a resolved component of the area thereof substantially in a horizontal plane so as to inhibit height variations of said vehicle with respect to the mean surface level of water traversed by said vehicle, and one or more free-ended laterally oriented flaps attached to or formed integrally with respect to and fully athwart at least some of said skirts, and each said skirt and/or each said associated flap being so positioned and dimensioned that each resulting partly water-immersed flap elevates its associated skirt to an increased height with respect to said means water level, with a resulting enhanced damped motion of said vehicle across said surface with reduced friction between said skirts and said surface and with a reduction of the progressive leakage of said air from beneath said air cushion chambers normally resulting from said motion.

In particular embodiments of the invention said foils may be of any size or shape, for example, flat sheets comprising simple rectangles or "diamond" shapes (pointed fore and aft). Alternatively, said foils may have an aerofoil section such as that employed on well-known hydrofoil vessels, such sections being adapted to assist lift.

Preferably, in the interests of lateral stability, the foils are disposed symmetrically about the longitudinal axis of the vehicle. Thus, one foil could be located upon each sidewall and/or one upon the centre wall.

In one such arrangement the outboard foils do not protrude beyond the outer limits of the sidewalls and the central foil or foils may be have approximately double the width of the outboard ones. In an alternative embodiment, the outboard foils may protrude equally beyond and within the outside walls and all said foils may be approximately the same size. In yet another embodiment, the keying effect provided by a plurality of said foils may be achieved by a complete sheet fixed across the base of the walls.

Because the vehicle is desirably reversible, any foils located towards the front thereof need to be repeated in a corresponding arrangement at the rear thereof. However, if reversibility of the vehicle is not required, in a more specialised arrangement one particular kind of foil may be located on the front only and some different kind may be used at the rear.

Whatever the shape or disposition of said foils, they may be either fixed or adjustable. In the latter case, for example, they may be hinged toward their front ends and provided with some kind of remote lift mechanism on the rear thereof so as to be inclined generally at an angle with the direction of travel of the vehicle to give lift to it, for starting or other purposes. Such an arrangement may also be used as a balancing means to compromise between a lifting effect and a cushioning effect, depending upon the ambient conditions. In this case a shock-absorber similar to that used in a car suspension system may be substituted for, or used in conjunction with, said lift mechanism.

Any one of the above-mentioned arrangements may be either manually turned or tilted, or if desired automatically operated, for example with a shock-absorber-type effect at the back of the vehicle, the foil arrangement in this instance being hinged towards its front and tiltable either in towards the hull or away from it. This system is useful if the vehicle is coming down a swell, in which case a simple foil arrangement would tend merely to drag the hull into the next swell. To eliminate this effect but still provide a desirable damping effect the foil system could be of the above-mentioned type, adapted to swivel. That is to say, as it senses pressure from the front foils or a plurality thereof, it will swivel and at the same time it will have a damping effect because of the above-described shock absorbing means located near the rear of the hull.

For some purposes it may be desirable to provide means to control selectively the front of the hull but not the rear. With a trailing shock-absorbing type foil it is merely necessary for it to be present, to inhibit the jarring or bouncing which results from the impact of waves.

Said foils should preferably be located at such a depth, with respect to said walls, that effective immersion of said foils is maintained irrespective of the amplitude of the chop traversed by the vehicle.

Also said foils, even if fixed with respect to the vehicle, may be inclined with respect to the lateral axis of said vehicle for the following reasons:

(1) To reduce vertical acceleration and hence reduce impact or shock loads in the vertical sense.

(2) To correspondingly increase keying in a lateral sense during turns executed by the vehicle, especially at speed.

In said modification of the skirts, the latter still possess the same basic cross-sectional shape as defined in the parent invention, but instead of employing the type of jet control described in relation thereto the present invention employs a flap of the kind which simply protrudes, say, vertically from the centre of the skirt. Other positions may also give satisfactory results but wherever located upon any said skirt the flap preferably runs laterally across its full width and is composed of flexible material which may, for example, be that of the skirt itself. For simplicity, the flap is preferably located in a median position so that the vehicle is reversible. However, in the case of a non-reversible vehicle, it may be advantageously located in a particular position with respect to the median vertical plane. For example, said flap may be in a central position on each leading skirt whereas on the back skirts it may be moved forward towards the front or leading edge.

Any suitable mode of attachment may be employed. For example, two separate parts with a central join closed by adhesives or rivets may be employed to form both the skirt itself and a double-layer extension thereof constituting the flap. Alternatively, one-piece skirts may be employed with said flap added on and joined thereto by suitable means.

It will be appreciated that when the vehicle is in motion in either dirction the air cushion located behind any particular flap, that is, on the high pressure side of it, tends to extend the flap outwardly from its associated skirt. However, the motion of the water against the flap tends to move it towards the rear of the vehicle and thereby push it flat. The resultant forces cause the skirt to lift as a whole and run higher above the water with the flap partially immersed. This effect occurs with both leading and central skirts but the back skirt does not, of course, posssess an equivalent opposing force to counteract the effect of the pressurised air from the adjacent cushion, and hence the back skirts tend to lie flatter with their flaps inclined further towards the horizontal plane and as a result the vehicle, instead of running flat on the water, will sit up slightly in the front. This effect tends to limit the design depth of the flaps, said depth being of the order of approximately one quarter that of the associated skirts.

The effect of the flaps is to limit the frictional drag of the water upon the relatively moving skirts. Also, instead of moving the whole skirt when the vehicle is passing over a chop, the skirt is given more "dimension" so that the flap will take most of the shock of a wave, and tends to deflect in response to it and then be restored in position again after the wave has passed, thereby acting as a further or auxiliary shock-absorber.

The reduction of friction losses occurs because the usual surface contact is replaced by a close approximation to line contact, which results in lower drag even if the area of skirt presented to a wave is nominally the same as the area of contacting flap. This produces an effect similar to that of a hydrofoil vessel standing up on its feet to reduce surface friction by putting, in effect, an air cushion under its foils, and also lubricating the boundary layer between the foils and the water. The resulting motion is also similar to that of a hovercraft, which is essentially a means for reducing friction and lubricating the boundary layer between the vessel and the water traversed.

A further benefit derived from the present invention is that the loss of air from the front air cushion or cushions tends to be reduced because the leading flaps curl back and keep most of said air entrapped in the manner of a non-return valve. Air pumped into the front or any intermediate air cushions tends to move aft progressively instead of leaking out partly near the front of the vehicle where it would be of little benefit. Hence, the maximum advantage is gained from the available compressed air supplied to the air cushions. This rearwardly-moving air also serves to lubricate the following skirts and hence the entire vehicle proceeds with less frictional restraint.

Thus, it will be seen that the flaps constructed in accordance with the present invention tend to reduce still further the already minimal turbulence beneath the vehicle due to the passage of the skirts, and hence they produce an even smaller wake. This is due partly to the fact that the flaps have a smaller surface area than the skirts, and hence there is a smaller area for water to cling to and be temporarily lifted by. Furthermore, each flap tends to arrange itself so that its "tail" is tangential to the water surface, which is thus substantially unruffled. Hence, a very smooth flow of water takes place beneath the vehicle and said water can be observed to be almost free from aeration as it emerges behind the stern.

These desirable properties of the vehicle enhance one of the advantages of the parent invention namely, the ability to have a fast boat moving through groups of other boats or between banks without disturbing them unduly.

It will be seen that the two new features introduced by the present invention are clearly inter-related. That is to say, with said foil or said foils fitted the skirts need more resilience to allow easy movement to take place over waves without tending to rip the boat with strong forces. However, the flaps give the boat more freedom of movement, and so allow it to assume a higher position above the wave troughs. That is, they give more freedom of movement without actual force being imparted to the skirts. Thus, a compromise between two design parameters needs to be taken into consideration for a particular vehicle. For example, a more flexible skirt is desirable than in the absence of said flaps, because otherwise an excessive amount of upward movement might tend to rip the foils off the boat in a heavy chop. Then, after having keyed the boat to the water thanks to the fugitive effect of the foils it is desirable to retain that keying to position the boat in a nearly straight trajectory. However, it is equally desirable to prevent severe reactionary forces from ripping off the keying devices, and for this purpose the flexible skirts absorb the unwanted forces sufficiently to take any undue strain off the foils. Hence, after having accordingly designed softer skirts for this purpose (that is, to give a softer ride) something is needed to aid said highly flexible skirts so that it is not necessary to rely upon an excessive degree of stiffness in them, which would otherwise be necessary to provide directional stability. That aid is provided by said foils in accordance with the present invention.

Apart from the above-stated reasons, the function of said flaps in holding the vehicle higher above any turbulent water ensures that fewer wave forces affect the vehicle in the first instance.

In the main invention said source of pressurised air was, in one embodiment thereof, a single blower such as a centrifugal blower. According to the present invention, two or more such blowers may be employed. For example, one could act through smaller ducting to the inlets to the air cushions or to any number thereof, and another could be mounted with respect to the main ducting, being isolated from the first-mentioned blower, and could supply the skirts via said main ducting independently of the above-mentioned air cushions. In another modification, one said blower could be supplied for each air cushion, i.e. four in the embodiment described in the parent application. Because the skirts do not require much air volume, they compress the air as they move upwards and hence the blower or blowers supplying said skirts do not need to have as great a capacity as those supplying the air cushions. Alternatively, in a further embodiment, a large duct could be divided into, say, six separate parts, depending upon the position of the skirts. For each skirt a number of separate parts of said main duct could be supplied by a separate blower. In a further modification, some of said blowers could supply one skirt and one air cushion, say, near the centre of the vehicle. For example, using five blowers, four thereof could supply, say, the end skirts plus the nearest air cushion, and the one remaining central blower could supply the two central skirts.

In any one of the above-mentioned modifications, the arrangement may be symmetrical about the longitudinal or lateral axis of the vehicle.

In any case, where a plurality of blowers is used they may be isolated from each other by separate ducting or may supply the same ducting.

Said modifications permit the air pressure in the skirts to be adjusted separately from that in the air cushions, to ensure that the skirts provide a softer ride. Also, the adjustment of the skirt pressure, which is now possible independently, permits the height of the vehicle as a whole to be adjusted marginally. Thus, although increased pressure into the air cushions merely increases the rate of escape of air under the outside skirts, the skirt pressure may be adjusted independently to a fine degree (subject to the requirement that the skirts should not deflect outwards too much) to provide a compromise between good ride and performance.

In the main invention wherein a single blower supplied all requirements, the action of pushing down on one side of the vehicle did not affect stability up to certain limits. However, if continued, a pushing force on one side caused the flow of air to be reduced under the skirt nearest to the point of application of the force, thus bringing up the pressure in the air cushions and hence in the associated ducting and ultimately reaching a point where the air could return through the inlet from said ducting leading to the air cushions, and so causing a loss of stability. However, using said modifications, four separate blowers would permit such a downward pushing force on one side of the vehicle to reach a much greater magnitude, thereby decreasing the volume of air escaping and increasing the pressure therein, without risking any loss of said pressure. The vehicle thus more nearly resembles, in its stability characteristics, a flat-bottomed punt.

In the main invention, the skirt edges did not actually contact the walls. In a further modification, said skirts may be of such a width that rubbing against said walls occurs, and the effects of such rubbing are minimised by the installation of a removable wear strip in each instance upon the skirt edges. Said strip may, for example, be composed of thin metal. This is of significance when the vehicle is, say, immobilised in a dock, in which case barnacles would ultimately grow upon the inner surfaces of said walls. If the vehicle is then put into motion, the skirts move backwards and forwards in response to water turbulence and could otherwise rip the edges of said skirts if the latter were not so strengthened. Alternatively, or in addition, pliable metal strips may be employed, of a kind sufficiently strong to clear away such growth which may occur in intervals between active use of the vehicle. Said skirt edges may be doubled over the margins of the skirts, and sewn and/or adhered thereto. Similarly, the free edges of said flaps may be reinforced by means which merely clip over said last-mentioned edges in an equivalent manner.

In a further modification of the main invention, said replaceable wear strip may be used in addition to the strengthening strip above described, or the two functions may be embodied in the same strip. Such a strip may, for example, be a clip-on type arrangement composed of plastic, rubber or similar elastomeric material. This measure aids further in compensating for any flexibility of the walls of the vehicle. If desired, the edges of said strip may be suitably shaped, as by rounding or otherwise, in order to improve their sealing effect with respect to said walls and to reduce the friction encountered by said strips.

Any of the above-mentioned strengthening or replaceable wear strips may be attached to the skirt or flap edges by any suitable mechanical or chemical means, or any combination thereof.

In a further modification of the main invention, another skirt of larger size may be located over and about one or more of the original single skirts. The resulting outer skirt, if shorter along the direction of the vehicle's longitudinal axis than the inner skirt, would be wider than said inner skirt and would permit the inner skirt simply to sit against it and be held thereby. Looking endwise therealong, said inner skirt may bunch up slightly near its lowermost portion, being larger than said outside skirt, and looking thereacross it will appear to be just inside the outer skirt so that the latter takes the pressure applied to the hybrid structure. The inside skirt is not pushed down by any pressure from within because the air escaping along the sides of the outside skirt has sufficient room to move past the inside skirt. Thus the outside skirt tends to receive all the wear which may occur, until finally it may rupture, whereupon the inside skirt springs out and takes the pressure. Clearly there will be somewhat more loss of air after such an event, because the inside skirt has a lesser width and does not quite make contact with the rigid walls. However, under such conditions the vehicle may still be operated with only a small air loss, and with marginally diminished efficiency. Thus, a vehicle such as a ferry or pleasure craft could still run and return to base, with very little risk.

In this connection it is emphasised that emergency running is more readily maintained if it is the leading and middle skirts which are intact but only the stern skirts which are ruptured. In such a case the stern would merely settle somewhat, but if this is not desirable the vehicle could simply be reversed. Nevertheless such an arrangement confers a distinct safety advantage, because even if the outside skirt is ripped severely by a sharp object the inside skirt would merely tend to fly away from the invading source of damage, and stay intact until the outside skirt can be removed at leisure. This is a consequence of the fact that the inside skirt has no pressure sustaining it. Both skirts could, of course, be constructed from some relatively inexpensive material which need not be outstandingly durable, owing to the efficacy of the design and the ease of maintenance.

In a further modification of the main invention, said skirts may be constructed from laterally separate sheets of flexible material. Said sheets may be bonded together by any suitable means, from, say, three sections having the lower-most section replaceable, this being the region of the skirt subject to the maximum wear. Alternatively, the entire skirt may be of such inexpensive material that it may be worthwhile replacing it as a whole. Alternatively, said skirts may be constructed from longitudinally separate sheets which may be bonded together or may simply overlap and embrace each other frictionally. For example, the first of said sheets might pass below the next and could be one of a series of successive sheets, each overlapped by its predecessor. Clearly, for air to escape from a skirt so constructed, it would need to pull the skirt apart because internal pressure tends to keep said skirt in position.

In a further modification of the main invention, another system of multiple skirts may be used wherein each is located upon and in registration with the other. A section which would normally be convex could thus be made flat, and joined in turn to another section, one face of which is flat, and so on until a number of elements is built up so as to give any desired sectional shape, i.e. hemispherical, paraboloid or other elongated form. Such special sectional shapes may be selected to affect the ride qualities of the vehicle.

In a further modification of the main invention, one or more openings may be formed in the side walls, or through the upper rectangular platform of the vehicle. In the case of the sidewalls these, of necessity, would be located above the depth of the base of the skirt when the latter is in dynamic operation. To allow the vehicle to sit down effectively the mouth of each opening would need to be above the skirt level so that no air escaped under the end skirts. Apart from this factor, said openings may be located at any positions on said side walls or said rectangular platform, and are preferably provided with adjustable covers which may be controllable from the cockpit of the vehicle as described in the aforementioned copending application, Ser. No. 895,592 hereby incorporated by reference. Thus, using such an arrangement, a helmsman bringing the vehicle alongside a wharf or the like may control the vehicle by opening or closing said adjustable covers, to permit the vehicle to sit down with no air escaping out under the ends thereof. This feature may be significant if it is desired to use the vehicle for ferry service or the like, and prevents spray from being directed towards passengers or equipment located opposite the vehicle ends. This arrangement is also of advantage in preventing the skirts from vibrating undesirably when the vehicle is brought to rest.

Although the above-mentioned ability of the vehicle to operate as a raft is itself an inherent safety factor, the use of multi-blowers which enhances this raft-like characteristic ensures a further degree of safety since a plurality of separate blowers is statistically unlikely to fail simultaneously. Thus, a number of separate blowers each normally in operation together may be preferable or, if desired, two identical installations may be used, one main and one auxiliary, and switchable for use alternately. However, the last-mentioned arrangement does not provide such great efficiency as two independent systems used together, each supplying different blocks of cushions and/or skirts as described herein. It is emphasised that in a multiple blower arrangement it is inherently desirable to include provision to isolate a particular blower if it should fail. Thus, suitable shut-off gates or doors should preferably be installed so that air is not forced back into an inoperative blower. Similarly, if two or more separate blowers are connected in common to the same main ducting, selective cut-off means should be provided.

In order to afford the reader a better understanding of the invention, certain embodiments thereof will be described herein with reference to the accompanying schematic drawings, in which similar references indicate corresponding parts, and in which.

Figure 1:
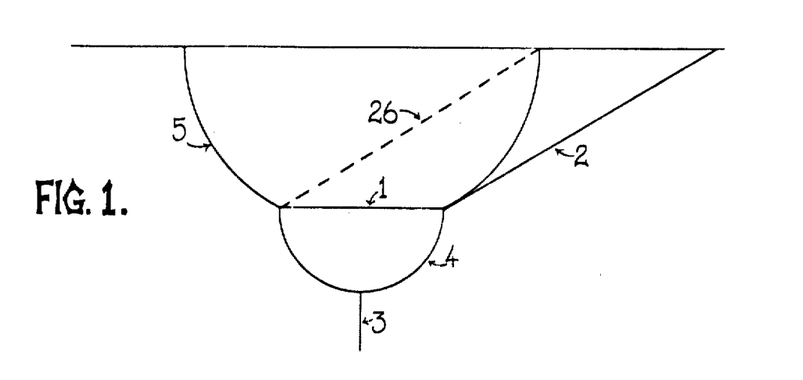
FIG. 1 represents a cross-sectional view of a multi-skirt system with two semi-circular sections.

Upon referring to the drawings it will be seen that, in particular, FIG. 1 is a cross-sectional view of a suitable multi-skirt having two semi-circular sections, 4 and 5. The portion 1 of semi-circle 5 is flattened because the pressure on one side is the same as the pressure on the other side. Brace 2 extends for the full width and 3 is a flap. The dotted line 26 depicts an alternative position for the brace.

Figure 2:
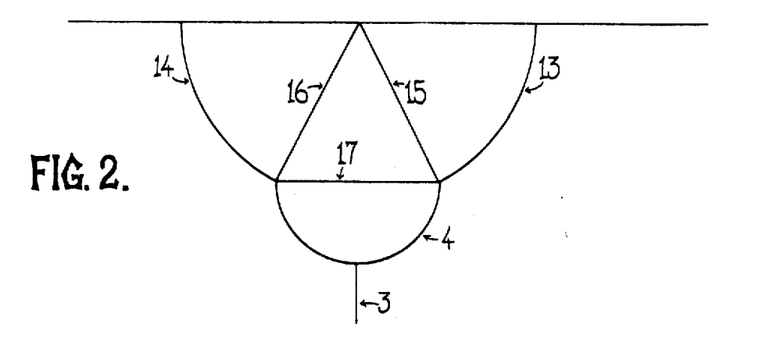
FIG. 2 shows a variation of the FIG. 1 system, with three such sections.

FIG. 2 is a cross-sectional view of a multi-skirt having three approximately semi-circular sections, viz. 4, 13 and 14. Items 15 and 16 are flattened sections of semi-circles 13 and 14, whilst 17 is a brace to maintain the diameter of semi-circle 4. Again 3 is the flap.

Figure 3:
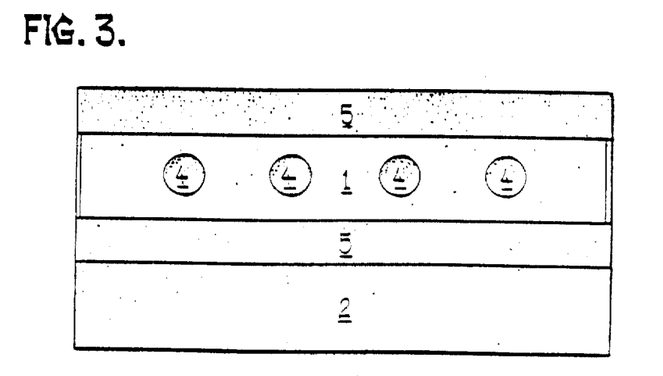
FIG. 3 is a plan view of the FIG. 1 system.

FIG. 3 is a plan of the multi-skirt depicted in FIG. 1 viewed from above and showing the full width brace 2, larger semi-circular section 5, and small semi-circular section 4 seen through its air inlet holes in the flattened section 1 of the larger semi-circular section 5. It is emphasized that in a multi-skirt it is possible to allow air to enter each section by means of air inlet holes in the flattened sections, or by having the flattened sections shorter in length than the skirt or by a combination of these methods. In any case, sufficient air must pass to fully replace the air lost between the end of the skirt and the sidewall. Further to this it may be necessary for a reverse flow of air in the case of skirt deflection, and the air inlets must be capable of accommodating this.

Figure 4:
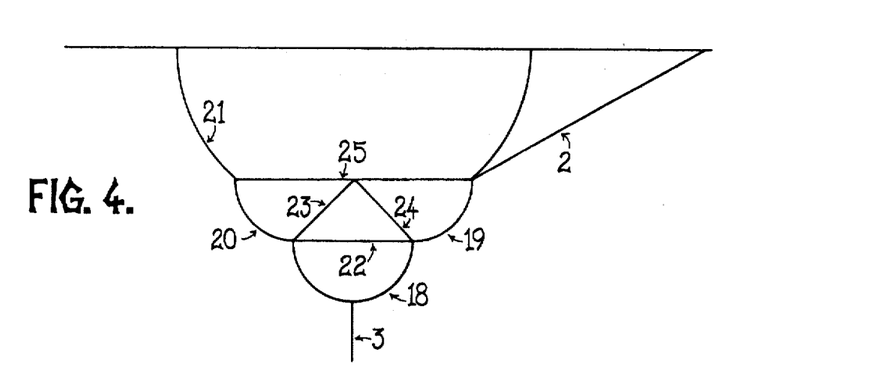
FIG. 4 shows another variation of the FIG. 1 system, with four such sections.

FIG. 4 is a cross-sectional view of a multi-skirt having four approximately semi-circular sections 18, 19, 20 and 21. Item 25 is the flattened section of 21, whilst 23 and 24 are the flattened sections of semi-circles 20 and 19. Brace 22 maintains semi-circle 18. Item 3 is the flap, and 2 is the support brace. In all cases the support brace 2 may be slightly shorter in length than the skirt. In the case of the brace 26 of FIG. 1, air inlet passages similar to those in 1 of FIG. 3 must be allowed for.

Figure 5:
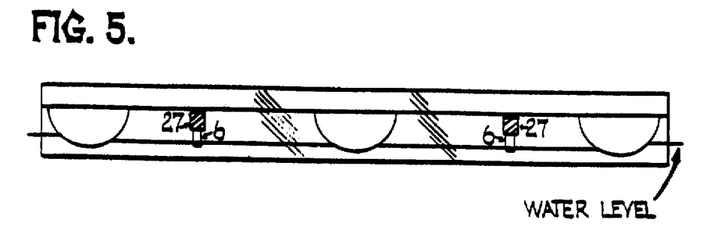
FIG. 5 shows an air cushion vehicle in side elevation, with air outlets in the sidewalls.

FIG. 5 is a side view of the vehicle with see-through sidewalls showing air outlets 6 and remotely controlled covers 27, and depicting the vehicle without air escaping under the end lateral seals.

Figure 6:
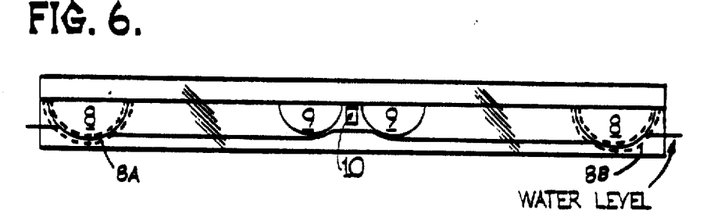
FIG. 6 shows an air cushion vehicle in side elevation, with air venting means under the central skirts.

FIG. 6 is a side view of the vehicle with see-through sidewalls showing a vehicle using a recirculating air system, air venting under the central skirts 9 and escaping through hole 10 or being recirculated through the blower. No air escapes under end seals 8, as they are deeper than the central seals 9.

Figure 7:
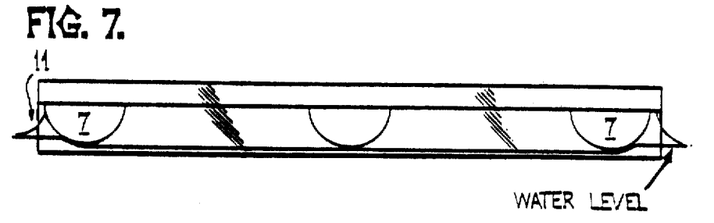
FIG. 7 shows an air cushion vehicle in side elevation, fitted with spray suppression flaps, FIGS. 8 to 11 inclusive show various cross-sections of skirts.

FIG. 7 is a side view of the vehicle with see-through sidewalls showing spray suppression flap 11 attached to the skirt and a similar flap 12 attached to the vehicle.

Figure 8:
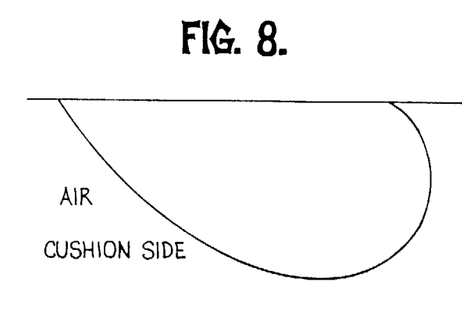

FIG. 8 is a cross-sectional view of the approximate shape of a single-piece semi-circular skirt when supporting an air cushion, i.e. when under load.

Figure 9:
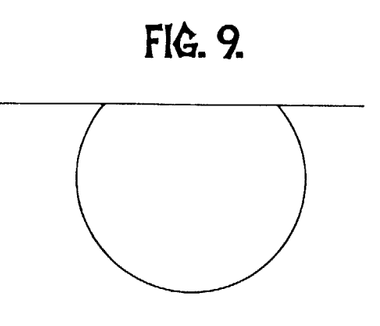

FIG. 9 is a cross-sectional view of a single-piece skirt wherein the length of the perimeter of the arc is greater than that length required to form a semi-circle.

Figure 10:
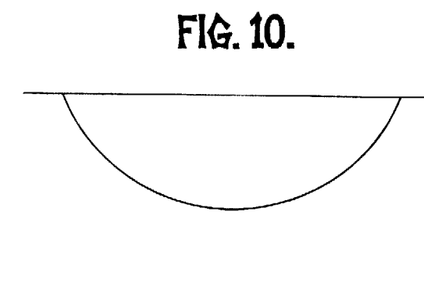

FIG. 10 is a cross-sectional view of a single-piece skirt wherein the length of the perimeter of the arc is less than that length required to form a semi-circle.

Figure 11:
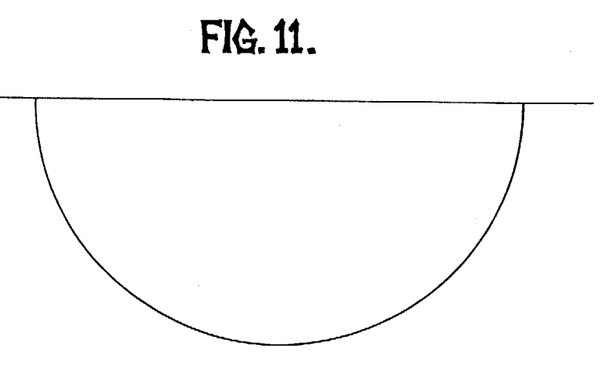

FIG. 11 is a cross-sectional view of a single-piece skirt having a semi-circular cross-section and showing the extent of the surface area of the skirt capable of frictional contact with water.

Figure 12:
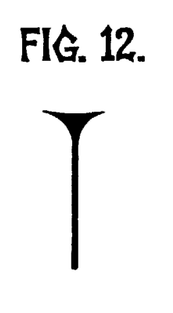
FIG. 12 shows a sectional view of a specially extruded alternate flap 3.
Figures 13, 14, 15, 16:
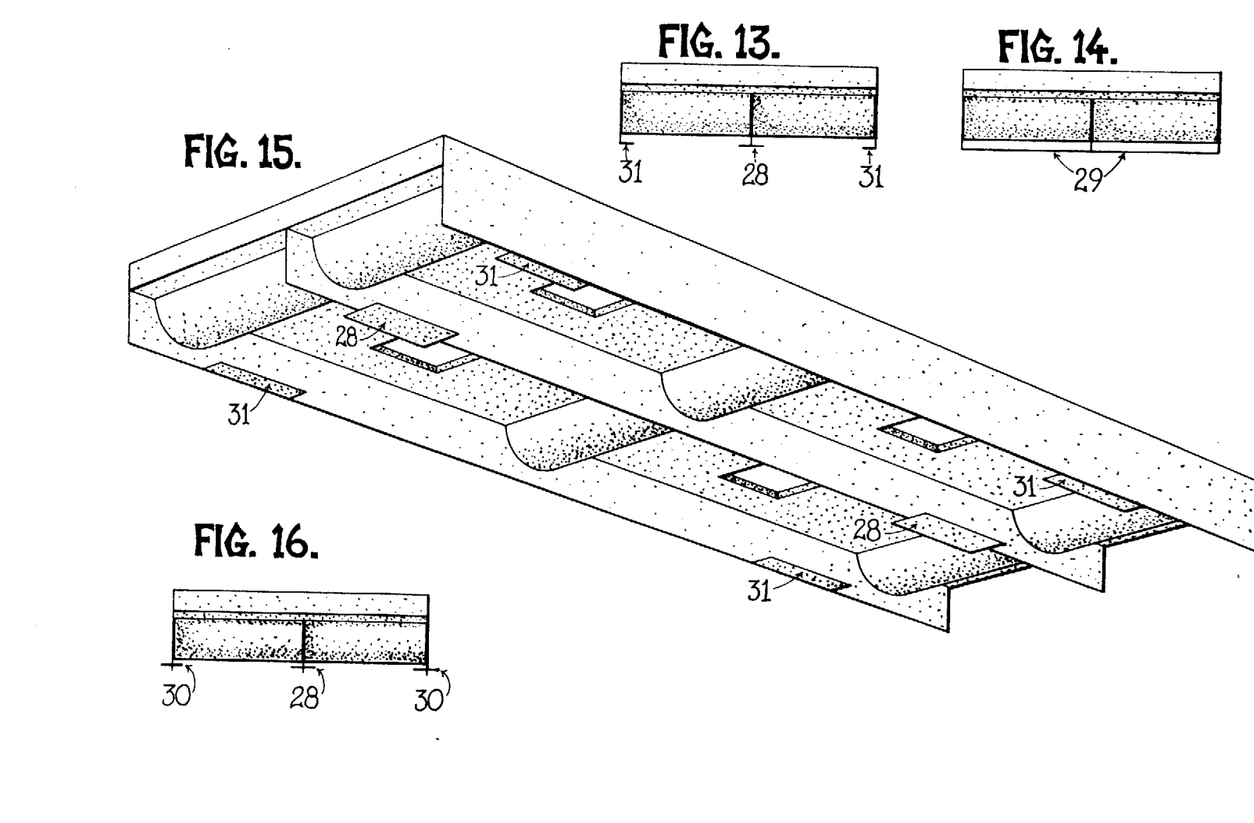
FIG. 13 is an end view of the vehicle showing a central foil 28, and non-protruding outside foils 31, the central foil being connected through a pivotal means 42 and shockabsorber 47 to the hull.
FIG. 14 is an end view of the vehicle showing a full width single piece foil 29.
FIG. 15 is a perspective under view of the vehicle showing possible positions of the foils 28 and 31.
FIG. 16 is an end view of the vehicle showing protruding outside foils 30 and inside foil 28 positioned up from the bottom of the walls.
Figure 17:
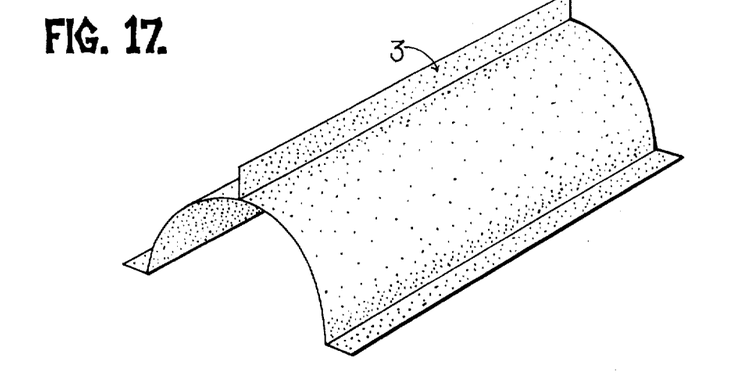
FIG. 17 is a perspective view of an upside down skirt showing full width flap 3.
Figure 18:
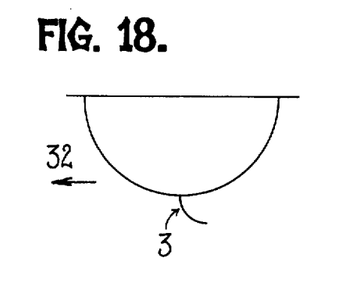
FIG. 18 is a cross-sectional view of a skirt showing a possible portion of the flap 3 when the skirt is moving in the direction of arrow 32.
Figure 19:
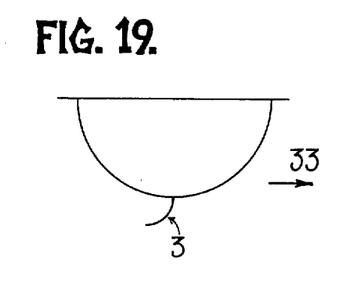
FIG. 19 is a cross-sectional view of a skirt showing a possible position of the flap 3 when the skirt is moving in the direction of arrow 33.
Figure 20:
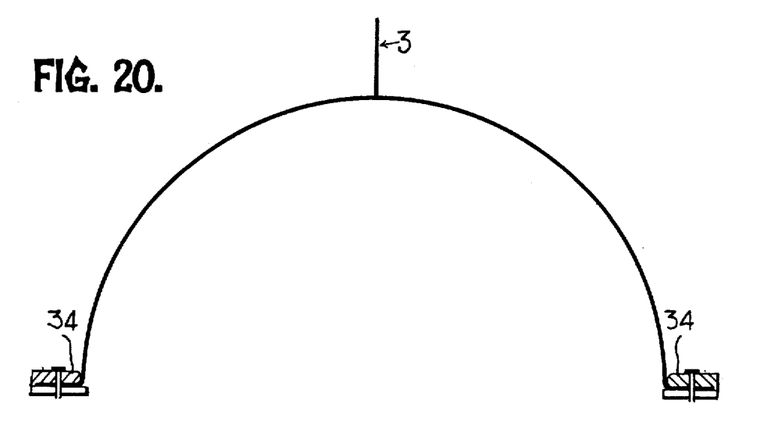
FIG. 20 is an enlarged cross-sectional view of the skirt depicted in FIG. 17, showing possible skirt clamps 34.

FIG. 12 is a cross-sectional view of a specially extruded form of the flexible flap which is shown in position as item 3 in FIGS. 1 and 2.

From FIGS. 1 and 4 it will be seen that the position of the full width brace 2 on the multi-skirt is such that it does not come into frictional contact with water when the skirt 5 or the skirt 21 is pushed towards the brace, and the brace distends.

A full width brace could be used as a safety feature and would support the skirt in the event of rupture of part of the skirt. The shape of the skirt is such that of its body only a small surface area can experience frictional contact with water, and this frictional contact is further reduced by the flap 3. (This is because the flap has a wave terrain following capacity inhibiting air loss from the air cushion, thus raising the vehicle and the main body of the skirt higher in relation to the mean water level). To explain this further it can be seen that this flap on a leading skirt will be forced back by oncoming chop whilst at the same time being forced forward by the air cushion pressure. Thus the flap will tend to act both as an extension of the skirt's depth and as a type of non-return valve. Because of the flap's freedom of movement and lack of inertia, its frictional contact and the pressure of its frictional contact will be far less than if the body of the skirt experienced the same contact and, because the flap is the main part of the skirt experiencing frictional contact with water, the skirt's total frictional contact is greatly reduced. It can be seen that the above characteristics of operation of the flap do not apply to the same extent to a rear end skirt, but the front end skirt is the most critical as far as ride is concerned. This is because sealing and venting occasioned by wave action on the front seals causes the pressure in the leading air cushions to rise and fall, thus lifting and dropping the vehicle and causing a rough, bouncy ride. (As explained earlier, with a multiple skirt and flap, sealing and venting does not occur to any extent. This is because of the flap's wave terrain following capacity, coupled to its action in elevating the skirt to a point where it comes into contact with very little of the chop). The same circumstances do not apply at a rear end skirt. (This is because the chop in moving under the vehicle is somewhat suppressed by the action of the air cushion pressure and the leading skirts. This, coupled with the fact that the supplied air is forced, by the non-return effect of the flap, to move under the vehicle and vent at the rear end skirt, causes a deeper air gap under the rear skirts, so allowing the rear end skirt to operate successfully without the full assistance of the flap). (Nevertheless, the flap, because it has a certain amount of rigidity, still operates as explained earlier, although to a lesser extent).

It can be seen that an end air retained bag-type skirt will experience a certain amount of cross-sectional deformation by virtue of the pressure difference experienced by the outside of the skirt, (see FIG. 8), one side experiencing the pressure of the air cushion it supports whilst the other experiences only atmospheric pressure. This deformation is proportional to the size of the skirt, the pressure of the air cushion and the cross-sectional shape of the skirt. It can be seen that a skirt of semi-circular cross-sectional shape will, when inflated, retain this shape, whereas a skirt wherein the length of the perimeter of the arc exceeds that length necessary to form a semi-circular cross-section will, when inflated, form part of a circle having a diameter greater than the base of the skirt, (see FIG. 9). It can be seen that the last-mentioned skirt shape will experience greater deformation (and hence collapse in depth when required to support an air cushion) than a semi-circular cross-section type skirt. Hence an ideal cross-sectional shape is semi-circular, but in order to gain the necessary skirt depth an excessive surface area of the skirt is capable of frictional contact with water. The multiple type skirt does not suffer this disadvantage and is capable of using the optimum semi-circular cross-sectional shape without a large surface contact area. Because a multiple skirt may be built up using the ideal cross-sectional shape (i.e. semi-circular or that cross-sectional shape where the length of the perimeter of the arc is less than that necessary to form a semi-circle, (see FIG. 10), it is possible to construct a skirt that will suffer far less distortion of shape and collapse in depth than a single piece skirt of the same depth. This multiple skirt gains the stability of freedom from collapse whilst still retaining its freedom of movement in response to deflection by chop or waves.

Another inherent disadvantage of the single-piece air-retained bag-type skirt is its tendency to bulge out away from the air cushion it supports, (see FIG. 8). This tendency, coupled with the skirt's collapse in depth under load, causes some degree of erratic behaviour of the skirt. This occurs when the skirt encounters a wave and stops or restricts the escape of air from the air cushion it supports, causing a pressure rise in this cushion and so causing the skirt to further bulge out and collapse in depth. The resultant movement of the centre of gravity of the vehicle allows the skirt supporting the other side of the vehicle to regain some of its lost height, thus causing a certain amount of instability in a vehicle using this type of skirt. The same instability outlined above occurs when a load is placed on one side of the vehicle and to a lesser extent when a load is placed on one end of the vehicle. The instability outlined above would be greatly reduced in a vehicle using the multiple type skirt and brace as proposed. This is because this skirt suffers very little collapse in depth or "bulge out". It is emphasized that a brace of the type depicted on the multiple skirt, when used on a single-piece skirt, does not restrict the collapse in height or bulge out of this type of skirt, because the surface that tends to bulge out is not restricted by the brace whereas with the multiple type skirt as depicted, this surface through its attachment to the brace 2 (FIG. 1) is supported or restricted.

Because of the multiple skirt's inherent ability to retain its cross-sectional shape under load, it is possible for the vehicle to operate properly with only a small pressure difference between the skirt pressure and the air cushion pressure, whereas with the single-piece type skirt this pressure difference must be far greater. This minimal pressure difference of the multiple skirts is of course of advantage in promoting a smoother ride, less wear on the skirts, reduction of the power required for the blower, and reduction of the structural strength required in ducting.

The multiple type skirt with its inherent stability of cross-sectional shape, coupled with the increase of depth facilitated by the flap, thus allows for a skirt of greater depth than would otherwise be possible. The multiple skirt could, of course, comprise any number of semi-circular sections, two of which are depicted in FIGS. 2 and 4, and not necessarily only two as shown in FIG. 1.

This multiple type skirt can be operated at full speed in either direction (the brace helping to retain the rear or trailing skirt). It can also be used at any position on the vehicle, this is, at the front, rear or intermediate positions.

The action of the flap, plus the flexibility of this multiple type skirt gives it excellent air retention characteristics.

Because of the action of the flap 3 of FIG. 1 in holding the main body of the skirt higher in relation to mean water level, and the fact that the flap experiences most of the frictional contact with water and absorbs most of the associated shock, the life of this multiple type skirt is greatly increased. It is, of course, possible to have both the flap and the lower semi-circular section 4 FIG. 1 of the skirt easily replaceable.

The flap reduces, to some extent, the depth of the air bag section of the skirt for any given total depth of skirt. Also, the flap increases the depth to which the skirt can penetrate into the water when the vehicle is stationary before the upward pressure of the water equals the pressure inside the skirt, and so causes the skirt to collapse. This, of course, further enhances stability under load imbalance.

In a vehicle having many lateral seals it is necessary that these seals should incur as little frictional resistance (when moving over water) as possible, since otherwise the essence of an air cushion vehicle is lost. It is also clear that in the vehicle of the main invention wherein there are many lateral seals, it is imperative that these seals should incur minimal frictional resistance. The multiple skirt and flap as described herein supply a skirt that incurs minimal frictional resistance, and in so doing further facilitates the efficient operation of the vehicle. This type of multi-seal vehicle would be somewhat inefficient if single piece air bag type seals were used for all the lateral seals.

With the vehicle sitting stationary on its air cushions the skirts can tend to vibrate. To rectify this, the openings 6 of FIG. 5 in the sidewalls can be opened so as to release the supplied air and stop the flow of air under the end seals. In addition, the inherent stability of the multiple skirt and brace tend to stop this vibration.

Air cushion vehicles have hitherto suffered from the disadvantage of spray issuing from under the air cushion seals. In the case of sidewall type vehicles this occurs under the end lateral seals such as 7 of FIG. 7, and is caused by the escape of the supplied air cushion air. It is an object of the system described below to stop or reduce this spray. This is accomplished by causing the air cushions to be vented at the centre of the vehicle rather than at the ends. To facilitate this, the end seals 8 of FIG. 6 are deeper than the central seals 9 of FIG. 6, there being two central seals in each longitudinal channel spaced just far enough apart to allow the escape of the supplied air cushion air. This air can then be vented through the sidewalls through opening 10 of FIG. 6, or recirculated through the blower.

In a further modification, the skirts may be of such a width that rubbing against the walls occurs, and the effects of such rubbing are minimized by the installation of removable wear strips 8A, 8B in each instance upon the skirt edges. Such strips 8A, 8B may, for example, be composed of thin metal. This is of significance when the vehicle is, say immobilized in a dock, in which case barnacles would ultimately grow upon the inner surface of said walls. Such a strip 8A may, for example, be a clip-on type arrangement composed of plastic, rubber, or similar elastomer material. This measure aids further in compensating for any flexibility of the walls of the vehicle. If desired, the edges of said strip 8A may be suitable shaped as by rounding or otherwise, in order to improve their sealing effect with respect to said walls and to reduce the friction encountered by said strips 8A and 8B.

Another device which may be used to stop or reduce the spray mentioned above is a flap of flexible material similar to that used in the skirts, attached to the outside of the end skirts 11 of FIG. 7, or the hull above it, such as 12 of FIG. 7, and having a length the same as the lateral length of the skirt, and a width sufficient to allow the flap to lie on top of the issuing air and spray, thus suppressing it. This flap may be slightly weighted along its free lengthwise edge in order to enhance its ability to suppress spray.

It may be necessary for the flap 3 of FIGS. 1, 2 and 4 to have some rigidity in order to maintain its position to some extent, and to this end it may be reinforced or strengthened with multi-layers of flexible material, or may even be a specially extruded rubber section similar to that shown in FIG. 12 attached in a way which renders it easily replaceable.

The claims defining the invention are as follows:

1. A waterborne air cushion vehicle comprising, in combination, a flat rigid upper rectangular sheet-like platform, a plurality of flat rigid longitudinal walls attached substantially at right angles thereto and depending therefrom substantially parallel with the major axis of said platform, two of said walls being disposed as sidewalls along the respective edges of said platform, a plurality of longitudinally spaced laterally aligned arrays of flexible trough-shaped skirts respectively looped with a space therein and fastened via each longitudinal edge thereof with respect to the underside of said platform flush with but independently movable with respect to adjacent pairs of said walls but extendable to a lesser depth than that of said walls, a source of pressurized air admissable via apertures of fixed size at a relatively higher pressure to said skirts and also admissable at a relatively lower pressure via variable-sized openings remotely controlled and located respectively beneath said platform in communication with at least four square or rectangular opening-bottomed air cushion chambers disposed laterally in pairs and each bounded by an adjacent pair of said skirts and by an adjacent pair of said walls, and wherein the depth of said walls and of said skirts is so related to the flow rate of said air that the vehicle is buoyant upon water with said walls protruding into said water sufficiently to prevent air spillage via said walls when the vehicle is urged longitudinally through said water by propulsion means, and wherein said skirt air inlet openings are adapted to re-admit by reverse flow at least part of the compressed air in any one of said skirts independently in response to fugitive deflection of said skirts resulting from turbulence of said water, to thereby inhibit movement of said vehicle about the pitch axis thereof; characterized in that each said skirt is bag-like structure adapted to resist changes in its cross-sectional shape under load by virtue of captive air therein and is attached along one side thereof to the underside of said platform via a brace comprising a flexible sheet extending throughout the width of said skirt.

2. A waterborne air cushion vehicle as claimed in claim 1, wherein a prolongation attached to or integral with the lowermost extremity of each said skirt, and extending laterally across the width thereof, is adapted to hold the body of each said skirt at an elevated level with respect to mean water level by at least partially relieving frictional resistance resulting from contact between the body of the skirt and said water during passage of the vehicle thereacross.

3. A waterborne air cushion vehicle as claimed in claim 1 or 2, wherein a friction-reducing seal is interposed between the skirt ends and sidewalls contiguous therewith to thereby provide a rubbing joint which inhibits air loss via said seal.

4. A waterborne air cushion vehicle as claimed in claim 3, wherein each said seal includes a wear-resistant rubbing surface adapted to increase the durability of said joint.

5. A waterborne air cushion vehicle as claimed in claims 1 or 2, having one or more flexible flaps attached to the outside of each platform-end located skirt, each said flap having a length commensurate with that of the lateral dimension of its associated skirt, and having a width sufficient to permmit said flap to overlie any air issuing from beneath said skirt, to thereby suppress any resulting spray generated by said air.

6. A waterborne air cushion vehicle as claimed in claims 1 or 2, wherein said air cushions are vented near the centre of said vehicle under the influence of end seals which are deeper than corresponding centrally-located seals, there being at least two said central seals in each of a pair of longitudinal channels spaced sufficiently far apart to permit the escape of air from the air cushions supplied therewith, said escaped air then being vented through said sidewalls via openings therein.

7. A waterborne air cushion vehicle as claimed in claim 1 or 2, having air cushion air exit means with adjustable flow control means therefor, controllable remotely by an operator of said vehicle.

8. A waterborne air cushion vehicle as claimed in claim 1, wherein one or more foils is attached with respect to at least some of said sidewalls, each said foil being oriented with a resolved component of the area thereof substantially in a horizontally plane to thereby inhibit height variations of said vehicle with respect to the mean surface level of water traversed by said vehicle.

9. A waterborne air cushion vehicle as claimed in claim 1, wherein each said skirt has a separate inner contiguous layer of material each said inner layer being marginally longer than the longitudinal dimension of its associated skirt, and marginally shorter than the lateral dimension of said skirt, thereby replacing said skirt in the event of rupture of the latter.

10. A waterborne air cushion vehicle as claimed in claim 1, wherein each said skirt is a multiple structure, comprising a plurality of separate bags having different sectional shapes, whereby a composite sectional shape is selectable to achieve a desired ride quality of said vehicle.

* * * * *